F. P. Marcy.
Boot Crimper.

Nº 97,944.          Patented Dec. 14, 1869.

Witnesses
Samuel Jacob Wallace
John K. Day

Inventor
F. P. Marcy

United States Patent Office.

FREMAN P. MARCY, OF KEOKUK, IOWA.

Letters Patent No. 97,944, dated December 14, 1869; antedated December 4, 1869.

IMPROVED BOOT-CRIMPER.

The Schedule referred to in these Letters Patent and making part of the same.

*To all whom it may concern:*

Be it known that I, FREMAN P. MARCY, of Keokuk, Iowa, have made a new and useful invention of Improved Apparatus for Use in Manufacture of Boots; and I do hereby declare the following to be a full, clear, and exact description thereof, reference being had to the accompanying drawings, and to the letters of reference marked thereon, in which—

Figure 1:
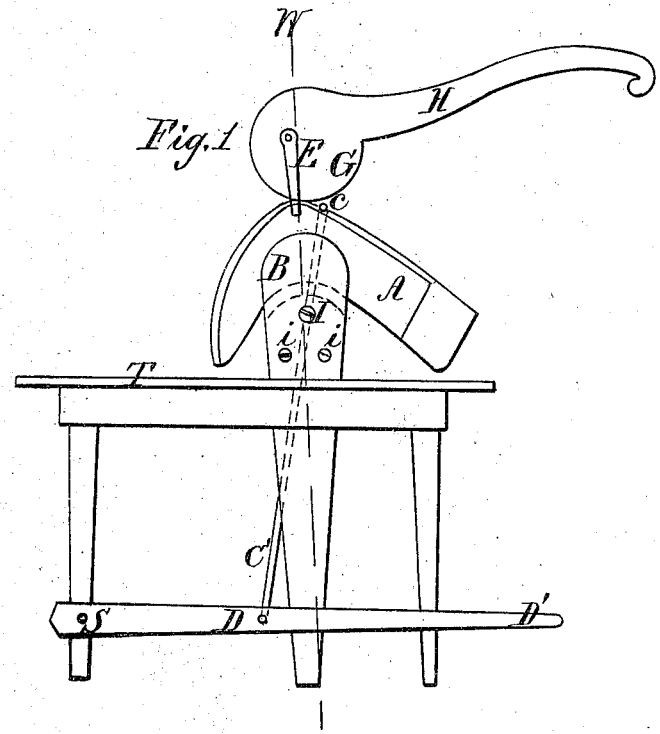
Figure 1 is a side elevation of my apparatus.
Figure 2:
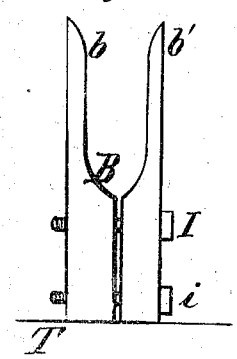
Figure 2 is a vertical section of a part, on line $w\ x$.
Figure 3:
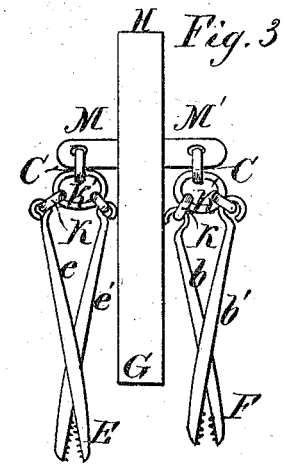
Figure 3 is a like section of another part on same line.

This invention is an improved apparatus for use in preparing front "uppers," in manufacturing boots, designed to do a certain part of work better than heretofore, and to save a number of appliances required therefor.

It is made as shown and set forth.

The front "uppers" of boots, either after or without "breaking," are placed on a proper-shaped board, or "former," A, similar to that usually employed.

This board is then placed in a vise, B, and a hook, C, is brought over the top of it, and by this it is drawn down into the vise by a foot-lever, D, to which the hook is connected. This is to draw and press out the "upper," and leave no wrinkles in it, and to hold it during the whole operation.

Now, two sets of jaws, E and F, are attached, one on each side, to the back of the "upper," as the cam G rests on the back of board A, the jaws being attached to, and swinging from the axis M of the cam.

The cam has a hand-lever, H, of which it forms part. This is pressed down by hand, and, by the cam, draws the jaws, forcibly causing them to close upon, and draws the "upper" with great power, stretching it, to give it a permanent set, by removing the elasticity so that the ordinary tacking will hold to the board without the great number of "heel-screws" to the "form"-boards, usually required, thereby dispensing with their entire number, to a great saving, while doing the work better.

"Screws and jaws" have been used, heretofore, at the point of heel, but they were limited in their effect, and each was a fixture to a single board or form, while this can be applied at all points of the back, heel, and foot, and one set will serve for the whole use of a workman.

Simple pincers and a rubbing-stick have completed the process which this cam, vise, and pincers now complete to better advantage.

The vise B is formed of two side-boards $b\ b'$, at a proper distance apart, and with a proper-shaped space between them, somewhat wedge-shaped, so that the board A can be tightly drawn down between them during the operation.

These jaws, $b\ b'$, are kept at a proper distance by bolts, $I\ i\ i'$, to suit any thickness of "uppers."

The jaws E and F are one on each side of cam G, and their arms, $e\ e'$ and $f\ f'$, are attached, by short links, K K' and $k\ k'$, to rings, L $l$, which depend from pivots, M M', in the sides of cam G, so the turning of the cam will draw the jaws to close them on the "upper."

The jaws have notches, suitable for holding. The whole swinging freely on pivots, M M', allows the cam to be turned by handle H.

Several of the parts admit of modification.

What I claim, is—

1. The hand-lever H and cam G, combined with the jaws E and F, made and adapted to use, substantially as set forth.

2. The combination and arrangement of vise B, hook C, jaws E F, cam G, and lever H, substantially as herein set forth.

F. P. MARCY.

Witnesses:
SAMUEL JACOB WALLACE,
JOHN H. DAY.